Mar. 20, 1923.

A. W. EGGER.
TRUCK UNLOADER.
FILED JUNE 24, 1921.

1,448,835.

2 SHEETS—SHEET 1.

INVENTOR
A. W. Egger
BY
Munn & Co.
ATTORNEYS

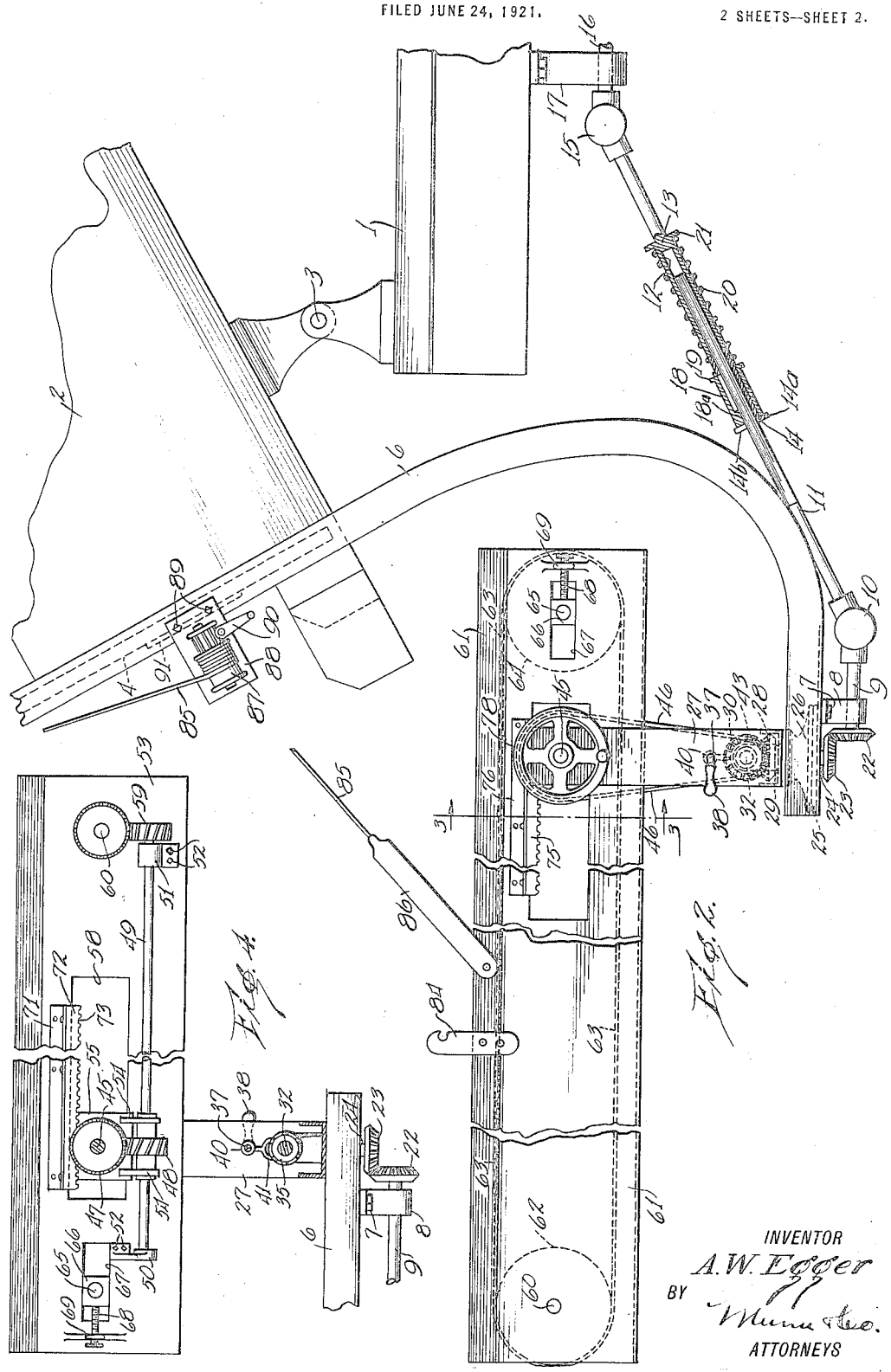

Patented Mar. 20, 1923.

1,448,835

UNITED STATES PATENT OFFICE.

ALVA W. EGGER, OF JOLIET, ILLINOIS.

TRUCK UNLOADER.

Application filed June 24, 1921. Serial No. 480,018.

*To all whom it may concern:*

Be it known that I, ALVA W. EGGER, a citizen of the United States, and a resident of Joliet, in the county of Will and State of Illinois, have invented a new and useful Improvement in Truck Unloaders, of which the following is a full, clear, and exact description.

My invention relates to unloading devices for wagons or trucks having a tiltable body, and it consists in the combinations, constructions and arrangements herein described and claimed.

An object of my invention is to provide an unloading device adapted to be attached to a wagon or truck having a tiltable body and having means for conveying the load from the wagon or truck to a selected place.

A further object of my invention is to provide a device of the character described that can be positioned in desired angular relations with respect to intersecting horizontal and vertical median planes passing through the wagon or truck body, whereby the load of the latter can be deposited at various elevations either directly to the rear of the wagon or truck body or at either side thereof.

A further object of my invention is to provide an unloading device having extensible conveying means for transferring a load from the wagon or truck as desired.

A further object of my invention is to provide an unloading device that can be applied to a dump wagon or truck of an ordinary construction without any extensive changes, if any, being required in the ordinary construction of the latter.

A further object of my invention is to provide an unloading device that is adapted to be attached to a power driven truck or wagon and operatively connected to the power means of the truck or wagon to occasion the driving of conveying means embodied in the unloading device.

Other objects and advantages will appear in the following specification, and the novel features of the invention will be particularly pointed out in the appended claims.

Figure 1:
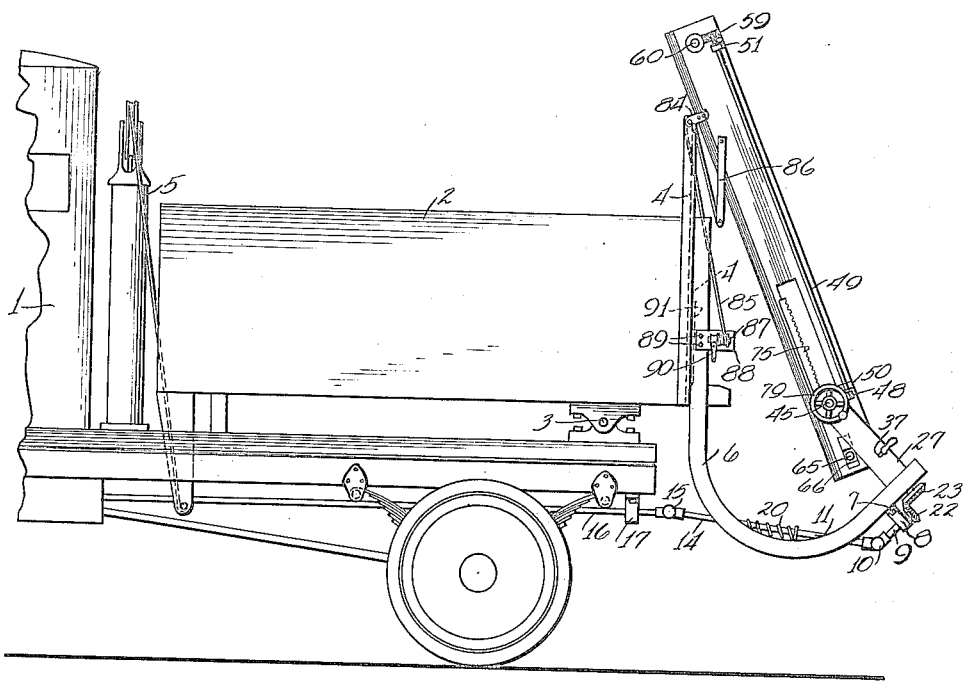
Figure 3:
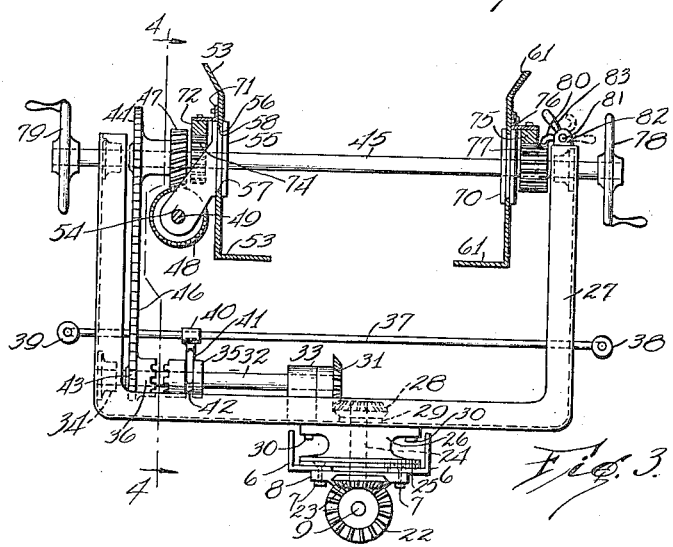

My invention is illustrated in the accompanying drawings, forming part of this application, in which Figure 1 is a side elevation of a fragmentary portion of a truck having the device operatively applied thereto and shown in idle position, Figure 2 is an enlarged view similar to Figure 1, showing the body of the truck tilted and the unloading device in position to receive a load discharged by the truck body, Figure 3 is a section along the line 3—3 of Figure 2, and Figure 4 is a section along the line 4—4 of Figure 3.

In carrying out my invention, I make use of a truck indicated generally at 1. The truck 1 is provided with a body 2 pivotally attached to the frame thereof in any suitable manner, as at 3, so that the front end of the body portion may be tilted to occasion the discharge of a load from the body 2 at the rear end thereof. The truck body 2 is provided with the usual end gate 4 at its rear end. Any suitable means for accomplishing the tilting of the dump body 2 at its front end may be employed and in Figure 1, such means is indicated generally at 5 and comprises a mechanism of a conventional construction.

The parts described so far are ordinary in construction and form no part of my invention except in so far as they cooperate with the parts about to be described.

A pair of substantially J-shaped supporting members 6 are secured to the end gate 4 so that the curved portions thereof depend below the truck body and are arranged with the curved extremities thereof positioned to the rear of the truck body. The supporting arms are preferably made of angle iron. Secured to the arms 6 adjacent to their extremities by bolts or rivets 7 is a hanger 8. The latter provides a bearing for a shaft 9 that is connected by a universal joint 10 to a shaft 11. The shaft 11 is non-circular and is adapted to enter a non-circular socket or bore 12 in a shaft 13. A bushing 14 is rigidly secured to the shaft 13 at its outer end in axial alinement therewith and is likewise provided with a non-circular bore adapted to receive the shaft 11. The bushing 14 has a flange $14_a$ at its outer end and is fashioned with a slot $14_b$ through its walls extending the length thereof. A retaining sleeve 18 is slidably mounted on the shaft 13 and is formed with a flange 19 at its end remote from the flange $14_a$ and carries a block $18_a$ rigidly secured to its inner wall and arranged to enter the slot $14_b$. A spring 20 is mounted on the shaft 14 and has its ends re-acting against the flange 19 and a flange 21 that may be a collar rigidly mounted on the shaft 13. When the retaining sleeve 18 is moved along the shaft 13 against the action of the spring 20, the shaft 11 may be moved through the slot 14, out of engagement with the shaft 13. The shaft 13 is connected by a universal joint 15 with a shaft 16 that is journalled in bearings 17 secured to the truck frame and is connected in any suitable manner at its forward end with the transmission of the truck.

The shaft 9 has a bevel gear 22 at its end engaging a bevel gear 23 carried by a shaft 24. The latter extends upwardly through a bearing plate 25 that is secured to the arms 6 by the rivets or bolts 7, through a pivot plate or block 26 that supports a U-shaped frame 27, through the frame 27 intermediately, and is maintained in position by a bevel gear 28 that is rigidly mounted on the shaft 24 at its upper end and rests upon a bearing plate 29. It will thus be observed that the shaft 24 performs the function of a king bolt in addition to performing the function of a shaft. The pivot plate 26 is secured by bolts 30 to the frame 27, as best seen in Figure 3, whereby the frame 27 can be swung about the axis of the shaft 24, pivoting on the plate 25.

The gear 28 is in mesh with a bevel gear 31 carried by a final drive shaft 32 journalled in bearings 33 and 34. The bearings 33 and 34 are secured to the web of the U-shaped frame 27. A clutch member 35 is slidably and rotatably mounted on the shaft 32 and may be selectively moved out of and into engagement with a cooperating clutch member 36. The latter is loosely mounted on the shaft 32. A clutch operating rod 37 disposed transversely of the frame 27 to project through the parallel arms of the latter is movable axially and provided with handles or grips 38 and 39 at its ends. A yoke 40 has branches 41 disposed in an annular groove 42 in the clutch member 35, whereby the movement of the rod 37 will occasion a corresponding movement of the clutch member 35.

The clutch member 36 has an integral sprocket 43 and a sprocket 44 loosely mounted on a shaft 45, that is journalled in the arms of the frame 27 adjacent to their ends, is driven by a chain connection 46 with the sprocket 43. The sprocket 44 is formed with a helical gear 47 integral with its hub and in mesh with a helical gear 48 slidably mounted on a driven shaft 49. The driven shaft 49 extends at right angles to the shaft 45, as best seen in Figure 4, and is journalled in brackets 50 and 51 that are secured by bolts 52 or like fastening means to a conveyor frame member 53. The gear 48 is maintained in constant engagement with the gear 47 by bracket arms 54—54 that are integral with a conveyor frame carrying and guiding member 55. The latter is mounted on the shaft 45 and is provided with grooves 56 and 57 in its opposite sides. The conveyor frame member 53 has the form best seen in Figure 3 and is formed with a longitudinally extending guide slot 58, the upper and lower edges of which are slidably disposed in the grooves 56 and 57, respectively, of the conveyor frame carrying and guiding member 55. The driven shaft 49 is provided with a helical gear 59 at its forward end arranged to drive a shaft 60 journalled in the conveyor frame member 53 and a similar parallel conveyor frame member 61. The shaft 60 carries a drum or sprocket 62 that is arranged to drive an endless belt conveyor 63. The latter extends substantially the entire length of the conveyor frame members 51 and 61 and is passed around a sprocket or drum 64 mounted on a shaft 65. The shaft 65 is journalled in bearings 66 that are slidably disposed in longitudinally extending slots 67 in the conveyor frame members, as shown. The bearings 66 may be moved along the slots 67 through the agency of an adjusting screw 68 that is threaded through a lug 69 integral with the conveyor frame member and has its end attached to the bearing 66. It will be understood that an adjusting screw 68 will be provided for the bearing 66 carried by each conveyor frame member.

The conveyor frame member 53 is movably supported by the guiding and supporting member 55, as stated, and the conveyor frame member 61 is likewise supported by a supporting and guiding member 70 that is mounted on the shaft 45 at a spaced distance from the frame member 53. Secured to the frame 53 by a bracket 71 is a rack 72 provided with teeth 73 in mesh with a pinion 74 rigidly mounted in the shaft 45. A similar rack 75 is attached to the conveyor frame 61 by a bracket 76 in a corresponding position and is provided with teeth in mesh with a pinion 77 rigidly mounted on the shaft 45. The shaft 45 is provided with handles 78 and 79 at the ends thereof. Operation of either handle will occasion the rotation of the shaft 45 and consequently the conveyor frame will be moved longitudinally as desired. It is to be understood that the frame members 53 and 61 may be connected at their ends in order to provide a more rigid construction. The conveyor frame is secured in adjusted position by means of a pawl 80 pivoted at 81 to a lug 82 integral with one arm of the frame 27. The pawl 80 engages the teeth of the pinion 77 and prevents the operation thereof. A handle 83 connects with the pawl at an angle less than a right angle, whereby the pawl 80 will be held out of engagement with the pinion 77 by gravity when the handle 83 is grasped and rotatively moved about the pivot 81 to lie on the end of the arm of the frame 27.

From the foregoing description of the various parts of the device, the operation thereof may be readily understood. When the device is not in service, the conveyor will be swung about the shaft 45 into the position illustrated in Figure 1, in which position it will be maintained by the engagement of latch members 84 with the end gate 4 at the upper edge of the latter. When in service, the conveyor will be swung about the shaft 45 into the position illustrated in Figure 2. A cable 85 connected at one end by means of a bail 86 to the conveyor frame intermediate the length of the latter is wound around a winding drum 87 carried by a bracket 88 that is secured to one of the arms 6 by bolts 89 or like means. The cable 85 is secured to the winding drum 87 and a winch handle 90 is provided for operating the drum. Consequently, the conveyor will be maintained in adjusted position and the handle 90 may be operated to move the conveyor about the shaft 45 from the position illustrated in Figure 2 to the position illustrated in Figure 1. The frame 27 can be moved about the shaft 24 as a pivot and consequently the conveyor may be positioned to deposit the load of the vehicle body 2 at the rear of the latter or at either side thereof. The conveyor frame will be moved relatively to the U-shaped supporting frame 27 when either of the handles 78 and 79 is manipulated to rotate the shaft 45 and can be locked in adjusted position through the agency of the locking pawl 80 that engages the pinion 77 in the manner described.

When the vehicle to which the device is applied is used in the ordinary manner, the shaft 13 is disconnected from the shaft 11 and the arms 6 and the parts carried thereby will then move with the end gate 4 when the latter is moved into open position to permit a load to be dumped in an ordinary manner. In the vehicle illustrated, the end gate 4 is hingedly connected at its upper end to the body 2 by any suitable means (none being shown). When the load is to be transferred from the body 2 through the agency of the device, a gate valve 91, that is ordinarily provided in the usual end gate construction of dump wagons, is opened and the load is discharged upon the conveyor. It is to be understood that the end gate 4 is in closed position at this time and that the shafts 11 and 13 are connected.

It will thus be apparent that I provide a device that can be attached to a dump wagon of an ordinary construction and operated when desired in the manner described and that the device can be instantly adjusted to permit the use of the dump wagon in an ordinary manner. While I have illustrated an embodiment of the invention in which a driving force is imparted to the conveyor from the transmission of the vehicle to which the device is applied, it is obvious that the shaft 24 can be rotated by any suitable power means and can be arranged for manual actuation without departing from the spirit and scope of the invention. Other modifications and adaptations of the form of the device illustrated may also be effected without departing from the spirit and scope of the invention as disclosed in the foregoing and defined in the appended claims, and I therefore consider such modifications and adaptations as my own.

I claim:

1. A device of the character described comprising a pair of substantially J-shaped arms adapted to be secured to the end gate of a vehicle body with the curved extremities of said arms positioned to the rear of the vehicle body, a conveyor consisting of a frame and an endless member carried by the frame, and means revolvable about a vertical axis and carried by said J-shaped arms adjacent to the ends of their curved extremities for supporting the conveyor frame for movement in the direction of its length and for positioning at various angles to the vertical axis of the last named supporting means.

2. A device of the character described comprising a pair of substantially J-shaped arms adapted to be secured to the end gate of a vehicle body with the curved extremities of said arms positioned to the rear of the vehicle body, a conveyor consisting of a frame and an endless member carried by the frame, means revolvable about a vertical axis and carried by said J-shaped arms adjacent to the ends of their curved extremities for supporting the conveyor frame for movement in the direction of its length and for positioning at various angles to the vertical axis of the last named supporting means, and means for maintaining said conveyor frame in adjusted angular relation to the vertical axis of the last named supporting means.

3. The combination with a power driven vehicle having a body tiltable at its front end, of an unloading device comprising a conveyor, a U-shaped frame, means carried by the arms of the U-shaped frame for movably supporting the conveyor, a rotatable vertical shaft projected through the web of the U-shaped frame intermediate its length, a gear carried by said shaft at its upper end for preventing displacement of the latter relative to the web of the frame, means attached to the vehicle body for supporting the U-shaped frame for movement about the axis of the shaft, means for detachably connecting the shaft at its lower end with the power transmitting means of the vehicle to occasion the driving of the shaft, and means carried by the frame and arranged to be actuated by the gear at the upper end of the shaft for actuating the conveyor.

4. The combination with a truck having an end gate, of a frame rotatably carried by said gate, a conveyor frame slidably carried by said first named frame, and having a universal movement with respect to said first named frame, means for locking said second named frame in adjusted position, and a conveyor belt carried by said second named frame.

5. The combination with a truck having an end gate, a power plant carried by said truck, of a frame rotatably carried by said end gate, a conveyor frame carried by said first named frame, and having a universal movement with respect to the first named frame, means for locking said conveyor frame in adjusted position, a conveyor belt carried by said second named frame, and means operatively connecting said belt to said power means, no matter in what position said belt is swung into.

6. The combination with a truck having a tiltable body an end gate, and a power means, of a conveyor carried by said end gate and being adapted to move into any position with respect to said end gate, a conveyor belt carried by said frame, and means operatively connecting said belt to said power means, no matter into what position said frame may be swung into.

7. The combination with a truck having a power plant, of a frame carried by said truck, a second frame rotatably carried by said first named frame, a conveyor frame pivotally and slidably carried by said second named frame, whereby said conveyor frame is adapted to be swung into any position with respect to said first named frame, means for moving said conveyor frame and for locking it in adjusted position, and a conveyor belt carried by said conveyor frame. and being operatively connected to said power means, no matter into what position said conveyor frame may be swung into.

ALVA W. EGGER.